United States Patent [19]

Umezawa et al.

[11] 3,886,133
[45] May 27, 1975

[54] PROCESS FOR PREPARING 3-AMINOPROPYL ESTER OF BLEOMYCINIC ACID AND BLEOMYCINIC ACID INCLUDING AN ACID SALT AND A COPPER COMPLEX THEREOF

[75] Inventors: Hamao Umezawa, Tokyo; Tomohisa Takita, Asaka; Akio Fujii, Tokyo; Takeyo Fukuoka, Omiya, all of Japan

[73] Assignee: Zaidon Hojin Biseibutsu Kagaku Kenkyu Kai, Japan

[22] Filed: Feb. 20, 1973

[21] Appl. No.: 333,629

[30] Foreign Application Priority Data
Feb. 17, 1972 Japan................................. 47-16020

[52] U.S. Cl.... 260/112.5; 260/239 A; 260/256.4 R; 260/256.5 R; 260/302 R; 260/309; 424/177
[51] Int. Cl.. C07c 103/52; A61k 27/00; C08h 1/00
[58] Field of Search................................. 260/112.5

[56] References Cited
OTHER PUBLICATIONS
Takita et al: Prog. Antimicrob. Anticancer Chemotherapy, 2, 1031–1036, (1970).

Umezawa: Asian Med. J., 13, 190–209, (1970).

*Primary Examiner*—Lewis Gotts
*Assistant Examiner*—Reginald J. Suyat
*Attorney, Agent, or Firm*—Oblon Fisher, Spivak, McClelland & Maier

[57] ABSTRACT

A process of preparing the 3-aminopropyl ester of bleomycinic acid or salts thereof and bleomycinic acid or salts thereof which comprises reacting 3-methylmercaptopropylamino bleomycin or acid salts thereof with a halide compound having the formula R—X, wherein R represents —CN, —CH$_2$CO$_2$H, —CH$_2$CO$_2$R$_1$, —CH$_2$CONH$_2$ and

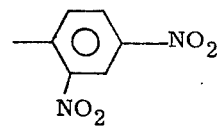

wherein R$_1$ represents a lower alkyl group; and X represents a halogen atom in an acidic aqueous medium, and then hydrolyzing the resulting 3-aminopropyl ester of bleomycinic acid in an acidic medium if bleomycinic acid is the product desired.

13 Claims, 4 Drawing Figures

PROCESS FOR PREPARING 3-AMINOPROPYL ESTER OF BLEOMYCINIC ACID AND BLEOMYCINIC ACID INCLUDING AN ACID SALT AND A COPPER COMPLEX THEREOF

BACKGROUND OF THE INVENTION

Field of the Invention:

This invention relates to a process for preparing bleomycinic acid and the 3-aminopropyl ester of bleomycinic acid. More particularly, it relates to a process for preparing a novel compound, the 3-aminopropyl ester of bleomycinic acid, by reacting a halide with 3-methylmercaptopropylamino-bleomycin, and a process for preparing bleomycinic acid by hydrolyzing the 3-aminopropyl ester of bleomycinic acid.

Description of the Prior Art:

Bleomycin, antitumor antibiotics are water-soluble basic glycopeptides which are chelated with divalent copper, and are produced from *Streptomyces verticillus*. They were first discovered by Hamao Umezawa, et al, in 1966, and reported in *Journel of Antibiotics* 19A, Page 200 (1966). 16 varieties of bleomycins have been produced and isolated by conventional cultivation methods including bleomycin $A_1$, $A_2$, $A_5$ and $B_2$. These latter derivatives have been used in a complex form for the treatment of squamous cell carcinoma, malignant lymphoma and cerebral tumors, and also exhibit antitumor effects and broad cancer indications.

The basic chemical formula of the bleomycins is shown as illustrated below. It has been known that various bleomycin derivatives can be formulated by changing the terminal amino-R group. In the starting material of this invention, 3-methylmercaptopropylaminobleomycin, R is the 3-methylmercaptopropylamino group. When R is the —OH group, bleomycinic acid is formed. If R is the $-OCH_2CH_2CH_2-NH_2$ group or the

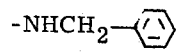

group, the 3-aminopropyl ester of bleomycinic acid or benzylaminobleomycin, respectively, are formed.

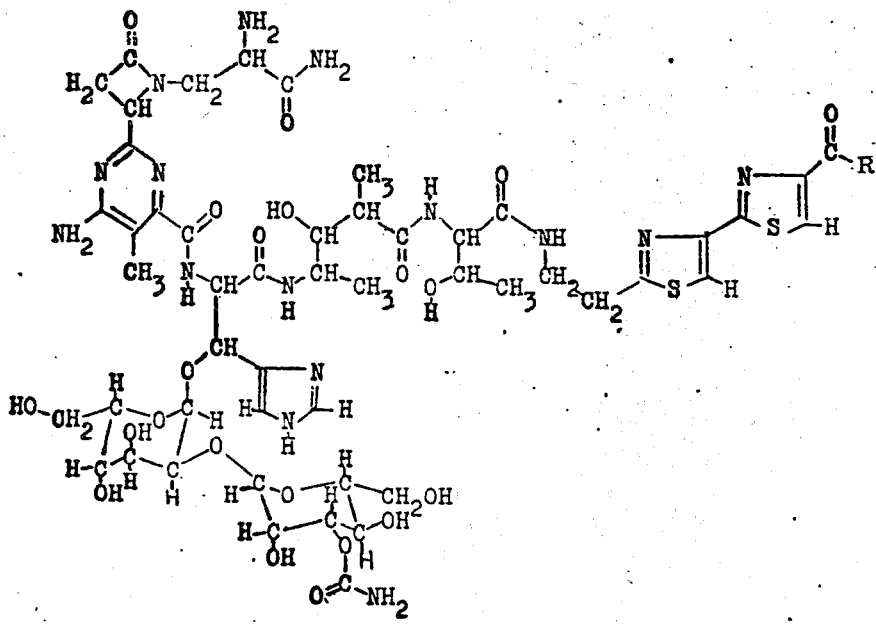

| R Group | Compound |
|---|---|
| $-NH-CH_2-CH_2-CH_2-S-CH_3$ | 3-methylmercaptopropylamino-bleomycin |
| 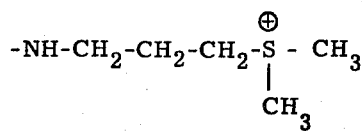 | 3-(S,S-dimethylmercapto)-propylaminobleomycin |
| -OH | bleomycinic acid |
| $-O-CH_2-CH_2-CH_2-NH_2$ | 3-aminopropyl ester of bleomycinic acid |
| 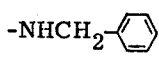 | benzylaminobleomycin |

It is known that when *Streptomyces verticillus* is inoculated and cultivated in a nutritious medium and if an amine which corresponds to the side chain amino group of the intended bleomycin is added as a precursor to the cultured medium, a novel bleomycin derivative containing the corresponding amino R group linked to the rest of the molecule via a peptide bond can be synthesized and isolated (Belgium Patent No. 745,926). The type of biological activity exhibited by the belomycins will vary substantially, depending upon the particular bleomycin derivative used. Thus, it is possible to develop excellent novel antitumor agents by isolating various bleomycin derivatives and testing the antitumor activities of the derivatives. However, in the above-mentioned fermentation process for producing bleomycins, the terminal amino-R groups which can be linked to the molecule are limited because of the biochemical synthesis methods employed.

It would be of great significance to be able to produce new synthetic bleomycin derivatives which exhibit antitumor effects and other broad anticancer effects by methods which do not involve conventional biochemical synthesis methods. A need therefore exists for a method of producing bleomycinic acid amides by reacting any desirable amine with bleomycinic acid to yield the corresponding amide derivatives. Thus, in the process of this invention bleomycins, which are prepared by a fermentation method, are hydrolyzed in the presence of microbial masses or enzymes to produce bleomycinic acid. Specifically, the selective cleavage of the terminal 3-methylmercaptopropylamino peptide bond of 3-methylmercaptopropylaminobleomycin has been studied.

SUMMARY OF THE INVENTION

One object of this invention is to provide a process for preparing the 3-aminopropyl ester of bleomycinic acid as an intermediate by a chemical reaction.

It is another object of this invention to provide a process for preparing bleomycinic acid which is useful for the preparation of desirable bleomycin derivatives from the 3-aminopropyl ester of bleomycinic acid.

These objects and other objects of this invention as hereinafter will become apparent can be achieved by the preparation of bleomycinic acid by the hydrolysis of the 3-aminopropyl ester of bleomycinic acid under acidic conditions which is prepared by reacting 3-methylmercaptopropylaminobleomycin with a halide compound having the formula

R — X wherein R represents —CN, —CH$_2$COOH, —CH$_2$COOR$_1$, —CH$_2$CONH$_2$

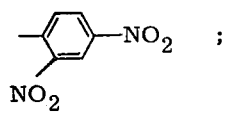

$R_1$ represents a lower alkyl group; and X represents a halogen atom; in an acidic aqueous solution or an acidic, water-containing organic solvent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE PREFERRED EMBODIMENTS

Figure 1:
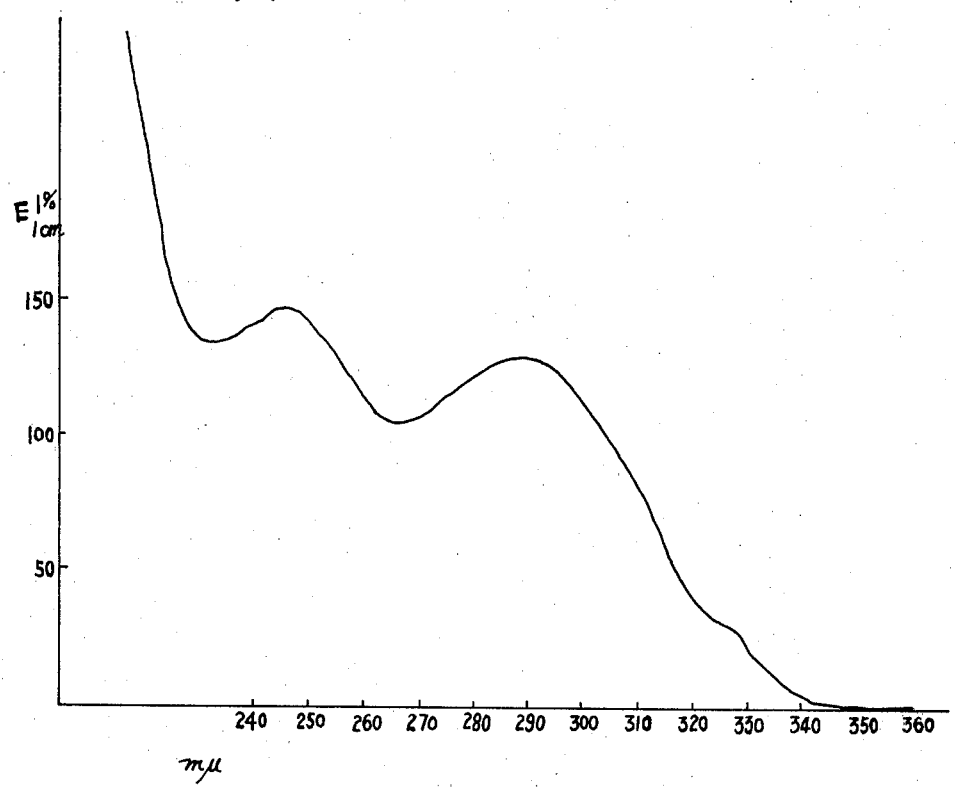
FIG. 1 is an ultraviolet spectrum of the 3-aminopropyl ester of bleomycinic acid (Cu complex).

In the process of this invention, 3-methylmercaptopropylaminobleomycin is dissolved in an acidic aqueous solution containing a mineral acid such as hydrochloric acid, hydrobromic acid, sulfuric acid; or an organic acid such as formic acid, acetic acid, trifluoroacetic acid or tartaric acid. The solution is then admixed with a halide such as cyanogen bromide (BrCN), iodoacetic acid (ICH$_2$COOH), ethyl bromoacetate (BrCH$_2$COOC$_2$H$_5$), iodoacetamide (ICH$_2$CONH$_2$), or 2,4-dinitrofluorobenzene

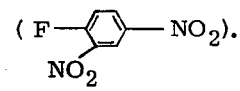

Usually 1–50 moles, preferably 3–30 moles, of the halide is used per mole of 3-methylmercaptopropylaminobleomycin, and the reaction components are reacted at 0° – 90°C. preferably for 14–48 hours. In order to increase the solubility of the halide compound, it is possible to add an organic solvent to the reaction medium. Suitable organic solvents include methanol, ethanol, acetone, dioxane, dimethylsulfoxide, dimethylformamide, ethylene glycol monomethyl ether sold under the trademark Methylcellosolve, and the like.

In accordance with the reaction of the invention, a halide compound is reacted with the 3-methylmercaptopropyl group (I) to introduce a —CN, —CH$_2$COOH, —CH$_2$CONH$_2$, —CH$_2$COOR$_1$,

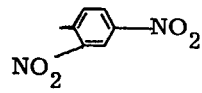

group or the like on the sulfur atom so as to form a sulfonium salt structure (II). The iminolactone (III) is then formed by the elimination of R—S—CH₃ as shown. Subsequent hydrolysis of the iminolactone produces the 3-aminopropyl ester of bleomycinic acid (IV). The reaction temperature is usually room temperature. However, sometimes, the conversion of structure (II) to structure (IV) can be promoted by heating the reaction mixture at 80° – 90°C. for 30–40 minutes in the instance where certain halide compounds such as iodoacetamide are used. If the pH of the aqueous solution is less than 1.0., it is preferable to cool the solution to about 0°C. in order to prevent side reactions of the belomycins. The reaction is shown by the following sequence of equations which involve the terminal —COR group of the bleomycin derivatives.

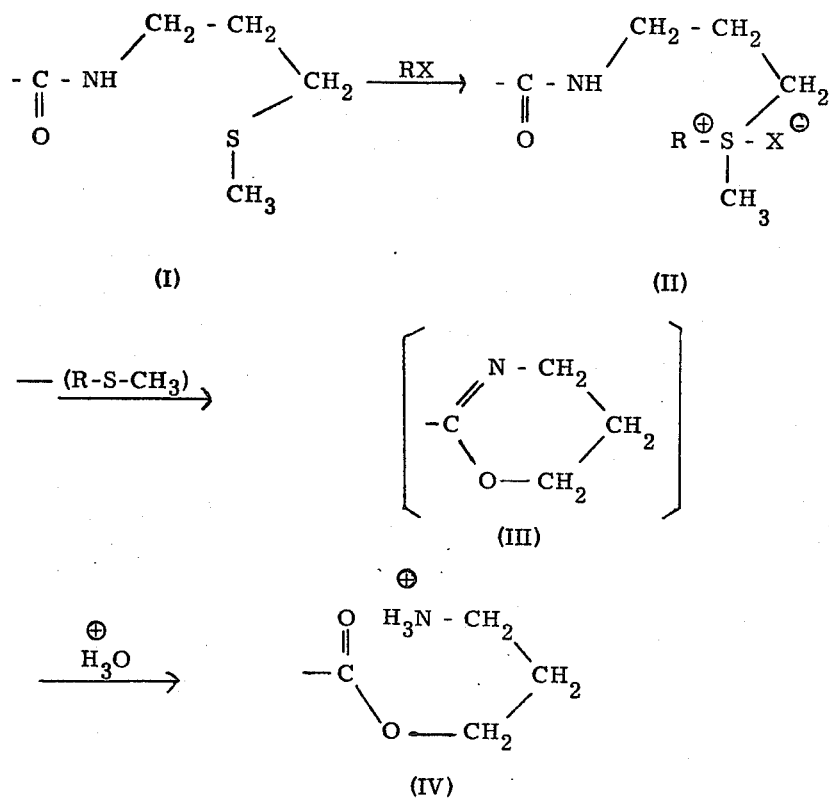

After the reaction, excess halide compound is removed. For example, a volatile compound such as cyanogen bromide is volatilized and removed under reduced pressure.

The following list is a brief description of the ion-exchange resins, gelfiltrants, adsorbents and thin-layer chromatography plates used in the experimental procedures of this invention.

CM-Sephadex C—25

A tradename for a dry insoluble powder composed of microscopic beads of synthetic organic compounds containing carboxy methyl groups derived from polysaccharide dextran manufactured and sold by Pharmacia Fine Chemicals, Inc.

Amberlite CG—50 Amberlite 45

A tradename for an ion-exchange resin manufactured and sold by Rohm and Haas Co.

Dowex 44 (OH⁻ type)

A tradename for an ion-exchange resin manufactured and sold by The Dow Chemical Co.

Sephadex G—25

A tradename for a gelfiltrant composed of a dextran derivative manufactured by Pharmacia Fine Chemicals Inc.

Silicagel G

A tradename for an adsorbent for thin-layer chromatography composed of silica gel and gyps manufactured by Merck Inc.

Avicel SF

A tradename for a thin-layer chromatography plate composed of crystalline cellulose manufactured by FMC Corporation.

Amberlist 15

A tradename for an ion-exchange resin manufactured and sold by Rohm and Haas Co.

Amberlite XAD—2

A trademark for an adsorbent resin composed of a styrenedivinylbenzene copolymer manufactured and sold by Rohm and Haas Co.

It is preferable to remove iodoacetic acid, 2,4-dinitrofluorobenzene and the like by extracting the halide with an organic solvent such as ether. Then, the reaction solution is neutralized with an aqueous sodium hydroxide solution to a pH of 4.5–5.0. Following the neutralization, the product and unreacted bleomycins are adsorbed onto a weakly acidic ion-exchange resin such as Amerlite CG—50 (H$^+$ type) by passing the solution through a column packed with the ion-exchange resin and filled with distilled water. The column is washed with water and then with 0.1–1.0 percent of an aqueous acetic acid solution. The column is then eluted with acidic methonal-water such as a mixture of 50 percent methanol and 0.02N HCl. The eluted fraction having a maximum absorption of 290 m$\mu$ is collected. The fraction is adjusted to a pH of 4.5 – 5.0 by the addition of pyridine. The effluent is concentrated and dried under a reduced pressure to yield a crude powder. The product is subjected to a column of CM—Sephadex C—25 buffered with a 0.05 M-pyridine-acetic acid buffer solution having a pH of 4.5.

The reaction product and the unreacted bleomycin can be separated into separate fractions by eluting the crude powder with the buffer solution having the same pH by gradually increasing the concentration of the pyridine-acetic acid buffer solution from 0.05 M to 0.5 M. That is, unreacted bleomycin is eluted with a 0.3 M-pyridine-acetic acid buffer solution while the 3-aminopropyl ester of bleomycinic acid is eluted with a 0.5 M-pyridine-acetic acid buffer solution. Accordingly, the 0.5 M effluent solution is collected and the crude product is isolated and dried. It is then reprecipitated from methanol-ether to yield an amorphous powder of the diacetic acid salt of the 3-aminopropyl ester of bleomycinic acid. The product is subjected with Amberlite IR—45 (Cl type) by passing it through a column packed with the ion-exchange resin, so that the dihydrochloride of the 3-aminopropyl ester of bleomycinic acid (Cu complex) is obtained. The physicochemical properties of the dihydrochloride of the 3-aminopropyl ester of bleomycinic acid (Cu complex) are shown in Table I.

TABLE I

| | | |
|---|---|---|
| (1) | Appearance | blue amorphous powder. |
| (2) | Solubility | soluble in water, methanol, and acetic acid; sparingly soluble in dimethylsulfoxide; and insoluble in ethanol, acetone, ether, benzene. |
| (3) | Reaction | Positive for the ninhydrin reaction, Dragendorf reaction, and the Pauly and Ehrlich reaction. Negative for the Tollens reaction, ferric chloride reaction, Fehling and Molisch reaction and Sakaguchi reaction. |
| (4) | Melting point (Decomposition) | at 201 – 203°C. |
| (5) | Specific rotation | $[\alpha]_{436}^{23} = -78.6°$ (c = 0.1 distilled water). |
| (6) | Thin-layer chromatography ($R_f$ value) | * (a) 0.74    (b) 0.50 |
| (7) | Paper chromatography ($R_f$ value) | 0.80 (Toyo filter paper No. 51; 10% ammonium chloride). |
| (8) | Paper electrophoresis Rm value...alanine:1.0) | 0.815 (at 3000V for 40 min.) (25:75:900 of formic acid) (acetic acid:water). |
| (9) | Ultraviolet maximum absorption m$\mu$ (E $_{1cm}^{1\%}$) | 290 m$\mu$ (131) 246 m$\mu$ (147) in distilled water |
| (10) | Infrared absorption spectrum (KBr) | at 3400, 1720, 1660, 1640, 1575, 1460, 1220, 1050, 765 (cm$^{-1}$). |
| (11) | Elementary analysis (%) as $C_{53}H_{76}N_{16}O_{22}S_2Cu.2HCl.H_2O$ | Calculated C : 42.21; H : 5.35; N : 14.87; O : 24.40; S : 4.25; Cl : 4.70; Cu : 4.21 Found C : 41.82; H : 5.41; N : 15.31; O : 24.52; S : 4.19; Cl : 4.46; Cu : 4.22. |

* (a) Silicagel G. methanol: 10% ammonium acetate = 1 : 1
  (b) Avicel SF n-propanol: pyridine:acetic acid : water = 15 : 10 : 3 : 12

Figure 2:
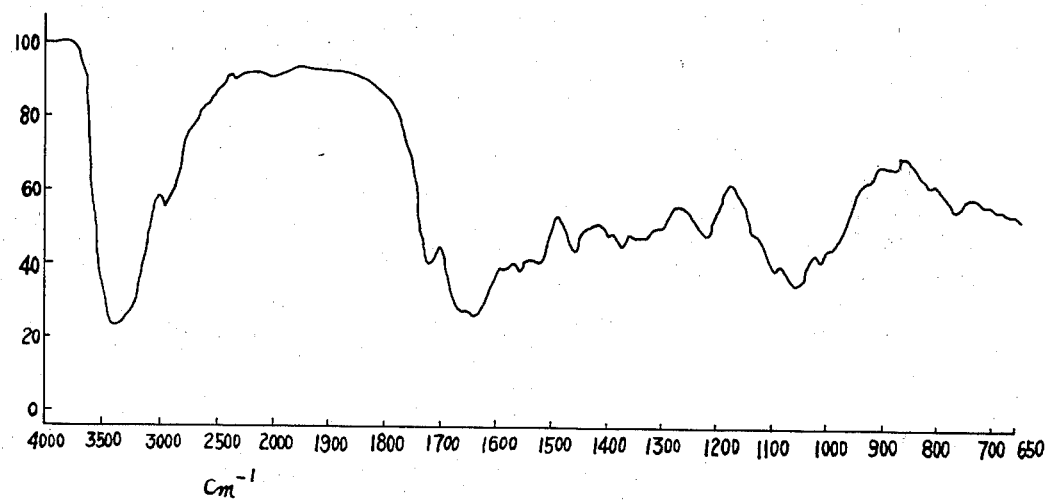
FIG. 2 is an infrared spectrum (KBr) of the 3-aminopropyl ester of bleomycinic acid (Cu complex).

The ultraviolet absorption spectrum of the product ester is shown in FIG. 1; and the infrared spectrum of the product ester measured in a K Br tablet is shown in FIG. 2.

When the product ester was completely hydrolyzed in 6N-HCl, no 3-methylmercaptopropylamine was found which is indicative of the starting material 3-methylmercaptopropylamino-bleomycin. As expected, 3-aminopropanol was found as a product of the hydrolysis reaction.

When a 2,4-dinitrofluorophenyl halide is used in the reaction, the amino group of 3-aminopropanol reacts with the 2,4-dinitrofluorophenyl group. In comparison to the 3-methylmercaptopropylaminobleomycin starting compound, the NMR spectrum (in heavy water, 100 MH$_z$ TMS external standard) of the product was no different from the NMR spectrum of the starting compound except that the 3 proton singlet at δ2.50 ppm disappeared. Similarly, the infrared spectra of the product and the starting compound were no different except for the increased ester carbonyl absorption at 1720 cm$^{-1}$ in the product. These facts and the physicochemical properties shown in the above table indicate that the product was the 3-aminopropyl ester of bleomycinic acid.

The 3-aminopropyl ester of bleomycinic acid can be easily converted to bleomycinic acid. Thus, the hydrochloride or the acetic acid salt of the 3-aminopropyl ester of bleomycinic acid is dissolved in distilled water and the solution is adjusted to a pH of 2.0–5.5 by adding hydrochloric acid or an aqueous sodium hydroxide solution. The solution is heated to 40° – 120°C. in an autoclave or an open reactor in order to hydrolyze the ester whereby the 3-aminopropanol to form bleomycinic acid.

In the reaction, the important consideration is the pH range. At a pH higher than 5.5, the side-reaction for producing 3-hydroxypropylaminobleomycin by an N,O-acyl rearrangement predominates over the hydrolysis of the ester bond. Thus, the production of bleomycinic acid significantly decreases. At a pH lower than 5.5, the rate of hydrolysis of the ester increases depending upon the decrease in pH. However, if the pH is too low, decomposition of the glycosidic bond of the ester occurs resulting in a decreased yield of bleomycinic acid. Accordingly, the optimum pH range is from 2–5.5. The reaction period can be selected to fall within the range of 1–24 hours depending upon the pH value and the reaction temperature.

In order to isolate the reaction product, the reaction solution is neutralized with an aqueous solution of sodium hydroxide in order to adjust the pH to 6–7. The solution is then diluted with water so as to maintain the inorganic salt concentration lower than 0.05 M. The diluted solution is passed through a column packed with CM—Sephadex C—25 (Na$^+$ type) or Amberlite CG—50 (Na$^+$ type) to separate the product. The product is eluted from the column with distilled water. Under these elution conditions bleomycinic acid is not adsorbed while the unreacted 3-aminopropyl ester of bleomycinic acid remains adsorbed on the column. Thus, the fraction containing bleomycinic acid which has a maximum absorption at 292m$\mu$, can be readily separated from its ester derivative. The effluent is further subjected to Amberlite XAD—2 or active carbon by column chromatographic adsorption and a successive elution for a desalting treatment. Then, the eluate is neutralized to adjust the pH to 6–7, and is concentrated and dried to yield an amorphous powder of bleomycinic acid. When the amorphous powder is obtained from an acidic solution, especially at a pH below 4.5, bleomycinic acid is obtained as mono hydrochloride. The physicochemical properties of bleomycinic acid (Cu complex) are shown in Table II.

TABLE II

| (1) | Appearance: | Blue amorphous powder. |
|---|---|---|
| (2) | Solubility: | Soluble in water; sparingly soluble in methanol, acetic acid, dimethylsulfoxide; insoluble in ethanol, acetone, ether, benzene. |
| (3) | Reaction: | Positive Pauly and Ehrlich reaction, Negative Dragendorf reaction, ninhydrin reaction, Tollens reaction, ferric chloride reaction, Fehling and Molisch reaction, and Sakaguchi reaction. |
| (4) | Melting point (decomposition) | 224 – 227° C. |
| (5) | Specific rotation | $[\alpha]_{436}^{27}$ –84.6°<br>$[\alpha]_{436}^{26}$ –81.5° (hydrochloride)<br>(C = 0.1, distilled water) |
| (6) | Thin-layer chromatography ($R_f$ value) | * (a) 0.78<br>(b) 0.46 |
| (7) | Paper chromatography ($R_f$ value) | 0.86 (Toyo filter paper No. 51; 10% (ammonium chloride) |
| (8) | Paper electrophoresis (Rm value...alanine:1.0) | 0.65<br>(at 3000 V for 40 min.)<br>(25 : 75 : 900 of formic acid; acetic acid;) (water) |
| (9) | Ultraviolet maximum absorption<br>m$\mu$ (E $_{1\ cm}^{1\%}$) | 292 m$\mu$ (145)<br>246 m$\mu$ (148)<br>in distilled water |
| (10) | Infrared absorption spectrum<br>(KBr method) | at 3350, 1720, 1670, 1640, 1580, 1460, 1365, 1050, 770 (cm$^{-1}$) |

TABLE II – Continued

(11) Elementary analysis (%)
as $C_{50}H_{69}N_{15}O_{22}S_2Cu$

Calculated:
C: 44.16; H: 5.11; N: 15.45;
O: 25.88; S: 4.72; Cu: 4.67.
Found:
C: 42.56; H: 5.27; N: 16.25;
O: 25.60; S: 4.68; Cu: 4.51.

* (a) Silicagel G methanol: 10% ammonium acetate : 10% ammonia water = 10 : 9 : 1
  (b) Avicel SF n-propanol: pyridine: acetic acid: water = 15 : 10 : 3 : 12

Figure 3:
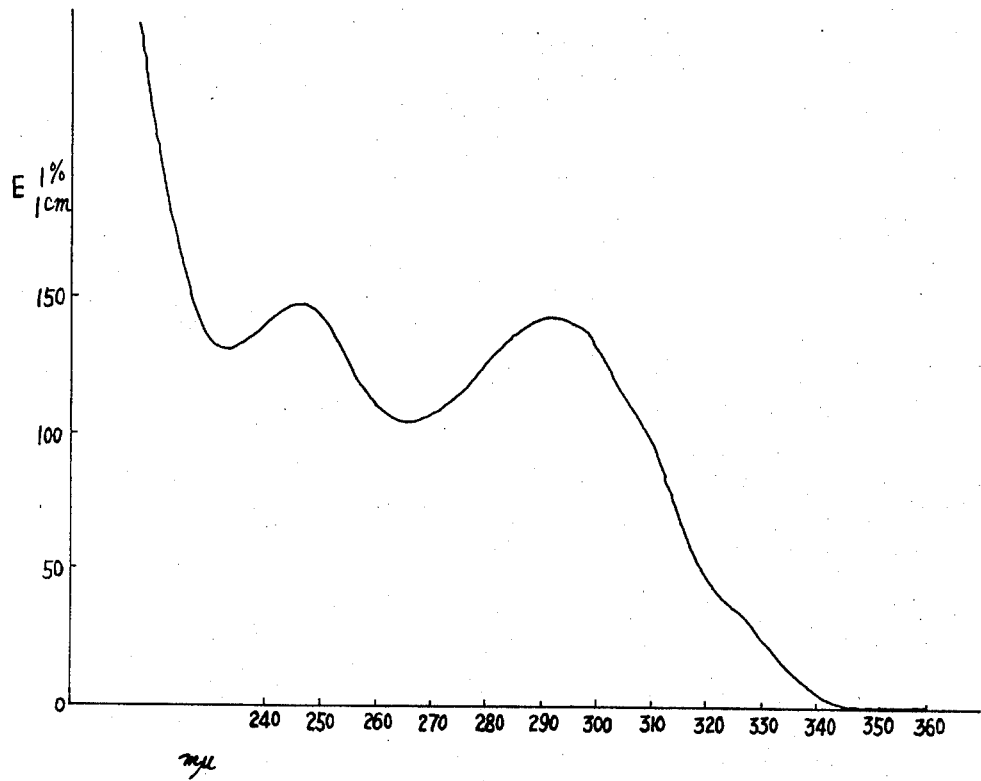
FIG. 3 is an ultraviolet spectrum of bleomycinic acid (Cu complex).
Figure 4:
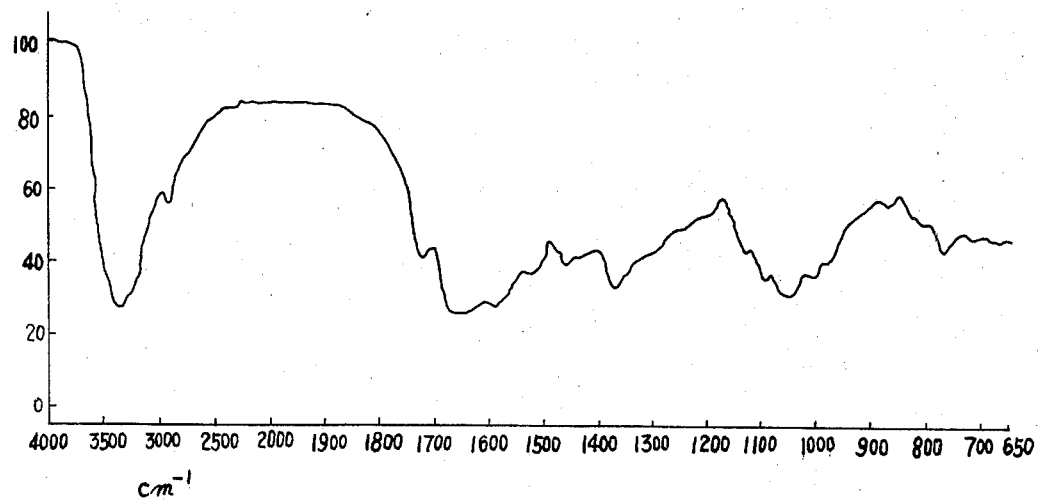
FIG. 4 is an infrared spectrum (KBr) of bleomycinic acid (Cu complex).

The ultraviolet absorption spectrum of the product acid is shown in FIG. 3; and the infrared spectrum of the product acid measured in a KBr tablet is shown in FIG. 4. When the product acid was completely hydrolyzed in 6N–HCl, no compounds containing terminal amino R groups were produced. The methyl ester or bleomycinic acid could be produced by dissolving the product in methanol-hydrochloric acid and permiting it to stand at room temperature for 48 hours. When the methyl ester was reduced with $LiBH_4$ in anhydrous tetrahydrofuran and was further completely hydrolyzed, the hydrolysate was found to be 2'-(aminoethyl)-2,4'-bithiazol-4-carbinol instead of 2'-(2-aminoethyl)-2,4'-bithizaol-4-carboxylic acid as tested by a two dimensional chromatograph (one dimension: high voltage paper electrophoresis: formic acid; acetic acid: water = 25 : 75 : 900 and the other dimension: paper chromatography: n-propanol: pyridine: acetic acid: water = 15 : 10 : 3 : 12. Toyo filter paper No. 51; ascending method).

When bleomycinic acid was treated with the strongly acidic ionexchange resin, Amberlist 15 ($H^+$ type), as a catalyst for the methanolysis reaction, and the methanolysate was converted to a triethylsilyl derivative and the product was measured by gas chromatography, it was found that 1 mole of L-gulose and 1 mole of 3-O-carbamoyl-D-mannose were produced as the methylglycoside.

The results obtained and the physicochemical properties shown in Table II confirmed that the product of this invention is bleomycinic acid.

The biological activity of the dihydrochloride of the 3-aminopropyl ester of bleomycinic acid (Cu complex) is as follows:

Test of Antimicrobial activity

Antimicrobial activity was measured by a cylinder-agar plate method, as compared with a standard of bleomycin $A_2$ (Cu removed), $1000\mu$/mg.

The test results are shown in Table III.

TABLE III

| Tested microorganism | antimicrobial activity $\mu$/mg |
| --- | --- |
| Mycobacterium smegmatis 607 | 1.335 |
| Bacillus subtilies PCI-219 | 1.150 |

Antitumor effects

A. Inhibition effect against Ehrlich solid tumor and determination of $ED_{50}$ $2 \times 10^6$ Mouse cells of Ehrlich ascites carcinoma were transplanted into a hypoderm of the inguinal region of ICR-SCL male mice. After 24 hours, the product was diluted with a physiological saline solution by a 3 times dilution method, and the physiological saline solution containing the dihydrochloride of the 3-aminopropyl ester of belomycinic acid was administered to said mice by intraperitoneal injection at a rate of 8.1 mg/kg – 0.03 mg/kg once a day for 10 successive days. The mice were bred 14 days after the first administration of the ester, and then were sacrificed. The tumors from each mouse were removed and weighed. The percent inhibition was calculated by comparing the results from the control mice with the results from the mice who were treated with the physiological saline solution. The results are shown in Table IV.

TABLE IV

| Dose (mg/kg) | 8.1 | 2.7 | 0.9 | 0.3 | 0.1 | 0.03 | 0 |
| --- | --- | --- | --- | --- | --- | --- | --- |
| Inhibition (%) | 69.9 | 69.9 | 68.7 | 46.1 | 6.5 | 0 | 0 |

From the results shown in Table IV, $ED_{50}$ was calculated to be 0.4 mg/kg/days (administered 10 times).

B. Growth inhibitory effect to culture cancer cells ($HeLaS_3$)

$HeLaS_3$ cells were plated at the rate of $1 \times 10^5$ cells/dish on a plastic dish and were cultured in a $CO_2$ incubator for 48 hours. Bleomycinic acid was added to the culture so as to achieve a final concentration of 15, 9 or 6 mcg/ml and the $HeLaS_3$ cells were cultured for 3 more days. The cell count was conducted and the growth inhibitory effect percent of the treated cells as compared to the control with no added ingredient was calculated. The results are shown in Table V.

TABLE V

| Dose (mcg/ml) | 15 | 9 | 6 |
| --- | --- | --- | --- |
| Inhibitory effect (%) | 75 | 49 | 28 |

Inhibition percent = $[1 - (T_3 - C_o/C_3 - C_o)] \times 100$;

$C_o$ : relative number cells on the day of drug addition $T_3$: relative number of cells on the third day after the addition of the drug $C_3$: relative number of cells in the control on the third day.

The probit percent of inhibition compared to the logarithm of the concentration was calculated from these results which gave an $ID_{50}$ value of 9.2 mcg/ml.

The belomycinic acid prepared by this invention has weak antitumor activity. However, it is possible to introduce any type of amine desired into the belomycin molecule at the terminal carboxyl group by a chemical reaction without the limitations existing in conventional fermentation processes for the preparation of bleomycin derivatives.

Accordingly, bleomycinic acid is a very important compound. For example, benzylamino-blemycin, wherein R =

in the formula, which can not be prepared by the fermentation process can be prepared by coupling benzylamine with bleomycinic acid and the product amide has the following properties.

The product is a colorless amorphous powder which gradually decomposes at temperatures higher than 218°C. It has maximum ultraviolet absorptions (in distilled water) at 243 $\mu$ ($E_{1cm}^{1\%} = 158.0$) and at 293 ($E_{1cm}^{1\%} = 120.5$). The antimicrobial activity of the product amide to Mycobacterium smegmatis 607 was 2,367$\mu$/mg.

The growth inhibitory effect of the product to the cultured cancer cells (HeLaS$_3$) are shown in Table VI.

TABLE VI

| Dose (mcg/ml) | 6 | 3 | 1.5 |
|---|---|---|---|
| Inhibitory effect (%) | 92 | 73 | 38 |

The characteristic properties of the product amide are as follows. The product was administered to ICR—SLC male mice by intraperitoneal injection at a rate of 10 mg/kg over a period of 10 days. The mice were bred for 5 weeks after the final administration of the drug, and were then sacrificed. The right and left lungs were observed by microscopic examination. The degree of fibrosis in the tissue of the treated mice was very low in comparison to those mice treated with known bleomycins B$_2$, as shown in Table VII. In general, fibrosis of lungs is the main side-effect of the action of bleomycins in the human body. It is expected, however, that various novel bleomycin derivatives can be obtained which have less side-effects from bleomycinic acid prepared according to the process of this invention.

TABLE VII

| | Lung | Degrees of fibrosis* | | | |
|---|---|---|---|---|---|
| | | − | ± | + | ++ |
| Bleomycin B$_2$ | L | 5 | 1 | 3 | 1 |
| | R | 4 | 3 | 3 | 0 |
| Benzylamino bleomycin | L | 8 | 1 | 1 | 0 |
| | R | 7 | 3 | 0 | 0 |

\* number of specimens
Degrees of fibrosis
− : void of fibrosis:
+ : a few foci of fibrosis
± : the presence of areas with questionable fibrosis
++ : scattered foci of fibrosis The starting material, 3-methylmercaptopropylaminobleomycin, can be prepared by the demethylation of bleomycin A$_2$, 3-(S,S-dimethyl mercapto) propylaminobleomycin, which can be prepared by cultivating the bleomycin producing microorganism, Streptomyces verticillus, in a nutritious medium at about 80°–120°C. for about 3–24 hours under a normal pressure, high pressure or reduced pressure. It is possible to add a medium to the culture which does not dissolve belomycin A$_2$, such as toluene, xylene, benzene, or the like. The resultant 3-methylmercaptopropylaminobleomycin (Cu complex, hydrochloride) is a blue powder which gradually decomposes at 201°–212°C., and is soluble in water or methanol but is insoluble in ethanol, propanol, butanol, ethylacetate, or the like.

It is preferable to use the Cu-complex of 3-methylmercaptopropylaminobleomycin or the 3-aminopropyl ester of bleomycinic acid both of which are in the form of a 1 : 1 complex with Cu++ because of the following reason. By forming Cu++ chelates of the bleomycin derivatives the side reactions are reduced and the location of the bleomycin derivatives are visible during the column chromatography of the complexes because of the blue color of the complexes. However, it is possible to use bleomycin derivatives free of copper which have been prepared by conventional Cu removing methods as a starting material of this invention. However, the same advantages obtained are not expected.

As stated above, bleomycinic acid prepared according to the process of this invention is a useful compound as a starting material for the preparation of specific known bleomycins and novel bleomycins. The 3-aminopropyl ester of bleomycinic acid is useful as an intermediate for preparing bleomycinic acid, and also has biological activities which make it useful as an antitumor and antimicrobial agent.

Having generally described this invention, a further understanding can be obtained by reference to certain specific examples which are provided herein for purposes of illustration only and are not intended to be limiting unless otherwise specified.

EXAMPLE 1

A 1.0 g quantity of the hydrochloride of 3-methylmercaptopropylaminobleomycin (Cu complex) was dissolved in 20 ml of a 1 percent aqueous trifluoroacetic acid solution and 2.0 g of cyanogen bromide was added to it with stirring. The reaction solution was at a pH of 0.7. The reactor was sealed and the contents were stirred at 27°C. for 18 hours, and excess cyanogen bromide was removed under reduced pressure. An aqueous 2N sodium hydroxide solution was added to the reactor with vigorous stirring and the solution was adjusted to a pH of 5.1.

The solution was charged into a column (150 ml) packed with Amberlite CG—50 (H$^+$ type) filled with distilled water. The material was washed successively on the column with 400 ml of an aqueous 0.3 percent acetic acid solution and 200 ml of distilled water. After washing, the blue colored fraction containing the bleomycin derivative was eluted and collected by elution with 0.02N HCl-methanol (1 : 1). Methanol was removed fron the product under reduced pressure. The residual solution was adjusted to pH of 4.5 by adding pyridine. The treated solution was charged to a column (100 ml) packed with CM Sephadex C—25 which was buffered with a 0.05N pyridine-acetic acid buffer solution having a pH of 4.5 so as to adsorb the bleomycin derivatives. This was followed by the addition of 100 ml of a 0.2N pyridine-acetic acid buffer solution having the same pH and then 100 ml of a 0.3N pyridine-acetic acid buffer solution having the same pH. All unreacted bleomycin was eluted from the column by this treatment. Thus, 100 ml of the first fraction was collected in which 254 mg of the bleomycin starting material was recovered. After another 80 ml fraction was eluted, 115 ml of a 0.5N pyridine-acetic acid buffer solution was charged to the column, whereby the 3-aminopropyl ester of bleomycinic acid was eluted. A 200 ml amount of the blue color fraction was collected in this manner and concentrated under reduced pressure and dried.

The product was dissolved in methanol-ether, and was reprecipitated to yield 528 mg of a blue colored amorphous powder of the acetic acid salt of the 3-aminopropyl ester of bleomycinic acid (Cu complex). The ester was charged into a column (20 ml) packed with a weakly basic ion-exchange resin Amberlite IR—45 (Cl⁻ type). The effluent was concentrated and dried to yield 497 mg of a blue colored amorphous powder of the dihydrochloride of the 3-aminopropyl ester of bleomycinic acid (Cu complex).

EXAMPLE 2

A 100 mg amount of the hydrochloride of 3-methylmercaptopropylaminobleomycin (Cu complex) was dissolved in a mixture of 1 ml of 0.2N HCl and 1 of methanol, and 52.3 mg of iodoacetamide was added to the solution with stirring. The mixture was stirred at 27° C. for 20 hours in a sealed tube. Excess iodoacetamide was extracted with ether. The remaining solution was heated at 85° C. for 35 minutes and then was adjusted to a pH of 5.0 by adding a 2N aqueous sodium hydroxide solution. In accordance with the process of Example 1, the product was isolated to yield 29.5 mg of the dihydrochloride of the 3-aminopropyl ester of bleomycinic acid (Cu complex).

EXAMPLE 3

A 100 mg amount of the hydrochloride of 3-methylmercaptopropylaminobleomycin (Cu complex) was dissolved in 2 ml of 95 percent acetic acid, and 240 mg of cyanogen bromide was added to the solution with stirring. The mixture was stirred at 27°C. for 24 hours in a sealed tube. Excess cyanogen bromide was removed under reduced pressure and the reaction solution was adjusted to a pH of 5.1 by adding a 2N aqueous sodium hydroxide solution. In accordance with the process of Example 1, the product was isolated to yield 17.9 mg of the dihydrochloride of the 3-aminopropyl ester of bleomycinic acid (Cu complex).

EXAMPLE 4 a 100 mg amount of the hydrochloride of 3-methylmercaptopropylaminobleomycin (Cu complex) was dissolved in 2 ml of 0.13N hydrobromic acid and 100 mg of cyanogen bromide was added to the solution with stirring. In accordance with the process of Example 3, the reaction mixture was treated to yield 29.6 mg of the dihydrochloride of the 3-aminopropyl ester of bleomycinic acid (Cu complex).

EXAMPLE 5

A 100 mg quantity of the hydrochloride of 3-methylmercaptopropylaminobleomycin (Cu complex) was dissolved in a mixture of 1 ml of 0.2N HCl and 1 ml of ethanol, and 47.74 mg of ethyl bromoacetate was added to the solution with stirring. The mixture was stirred at 27° C. for 20 hours in a sealed tube. Excess ethyl bromoacetate was extracted with ether, and the residual solution was adjusted to a pH of 5.0 by the addition of 2N sodium hydroxide. In accordance with the process of Example 1, the product was treated to yield 92 mg of the dihydrochloride of the 3-aminopropyl ester of bleomycinic acid (Cu complex).

EXAMPLE 6

A 100 mg amount of the hydrochloride of 3-methylmercaptopropylaminobleomycin (Cu complex) was dissolved in 4 ml of a 1 percent aqueous trifluoroacetic acid solution, and 36.06 mg of iodoacetic acid was added to the solution with stirring. The mixture was stirred at 27° C. for 24 hours in a sealed tube. In accordance with the process of Example 1, the product was treated to yield 14 mg of the dihydrochloride of the 3-aminopropyl ester of bleomycinic acid (Cu complex).

EXAMPLE 7

A 100 mg amount of the hydrochloride of 3-methylmercaptopropylaminobleomycin (Cu complex) was dissolved in a mixture of 1 ml of 0.2N formic acid and 1 ml of acetone, and 250 mg of 2,4-dinitrofluorobenzene was added to it. The mixture was stirred at 27° C. for 48 hours in a sealed tube. Excess 2,4-dinitrofluorobenzene was eluted with ether, and the resulting solution was adjusted to a pH of 5.0 by the addition of 2N sodium hydroxide. In accordance with the process of Example 1, the product was treated to yield 8 mg of the dihydrochloride of the 3-aminopropyl ester of bleomycinic acid (Cu complex).

EXAMPLE 8

A 100 mg amount of the hydrochloride of 3-methylmercaptopropylaminobleomycin (Cu complex) was dissolved in 2 ml of 1N $H_2SO_4$, and then 100 mg of cyanogen bromide was added to the solution with stirring. The mixture was stirred at 0° C. for 48 hours in a sealed tube. Excess cyanogen bromide was removed under reduced pressure and the reaction solution was adjusted to a pH of 5.0 by addition of 2N sodium hydroxide. In accordance with the process of Example 1, the product was treated to yield 26 mg of the dihydrochloride of the 3-aminopropyl ester of bleomycinic acid (Cu complex).

EXAMPLE 9

A 100 mg amount of the hydrochloride of 3-methylmercaptopropylaminobleomycin (Cu removed) was dissolved in 2 ml of 0.1 N HCl, and 200 mg of cyanogen bromide was added to the solution. The mixture was stirred at 27° C. for 24 hours in a sealed tube. In accordance with the process of Example 1, the product was isolated to yield 24 mg of a pale yellow powder of the dihydrochloride of the 3-aminopropyl ester of bleomycinic acid (Cu removed). The product was dissolved in water and 10 mg of basic copper carbonate was suspended in the solution while it was stirred for 30 minutes. Excess basic copper carbonate was filtered and the filtrate was treated by column chromatography by charging the filtrate to a column packed with Sephadex G—25 to yield 25 mg of the dihydrochloride of the 3-aminopropyl ester of bleomycinic acid (Cu complex).

EXAMPLE 10

A 1.0 g amount of the dihydrochloride of the 3-aminopropyl ester of bleomycinic acid (Cu complex) was dissolved in 10 ml of distilled water and the solution was adjusted to a pH of 4.0 by the addition of 0.1N HCl. The mixture was heated at 105° C. for 6 hours in a sealed tube. The reaction solution was adjusted to a pH of 6.5 by the addition of 0.1N sodium hydroxide, and was passed through a column packed with 20 ml of CM-Sephadex C—25 ($Na^+$ type). After removing 10 ml of the initial effluent from the column, 50 ml of distilled water was passed through the column, to elute all of the resulting bleomycinic acid in one fraction. The eluted solution was charged into a column (100 ml) packed with a nonionic-resin Amberlite XAD—2, filled with distilled water, so as to adsorb the bleomycinic acid. After washing the column with 200 ml of distilled water, the product was eluted with 200 ml of a mixture of 0.0025N HCl and methanol (1 : 1). Bleomycinic acid was eluted in 70 ml of the last fraction. The effluent was adjusted to a pH of 6.5 with a Dowex 44 resin ($OH^-$ type) and the solvent was concentrated. The resulting product was dried, and was reprecipitated from acetone containing water to yield 780 mg of a blue colored amorphous powder of bleomycinic acid (Cu complex). When the CM—Sephadex C—25 column was treated with 0.5M NaCl, 185 mg of the unreacted bleomycin was recovered.

EXAMPLE 11

A 1.0 g amount of the dihydrochloride of the 3-aminopropyl ester of bleomycinic acid (Cu complex) was dissolved in 20 ml of distilled water, and the solution was adjusted to a pH of 2.5 by the addition of 0.1N HCl. The mixture was heated at 100° C. for 1 hour, and the reaction solution was adjusted to a pH of 6.5 by the addition of 0.1N sodium hydroxide. The solution was charged to a column (50 ml) packed with Amberlite CG—50 ($Na^+$ type) filled with distilled water. After removing 20 ml of the first effluent, 150 ml of distilled water was charged to the column. All of the resulting bleomycinic acid discharged was collected in the fraction. The solution was passed through a column (50 ml) packed with active carbon (chromatography grade manufactured by Wako Junyaku K. K.) filled with distilled water to adsorb bleomycinic acid. After washing the column with 200 ml of distilled water, the product was eluted with 150 ml of a mixture of 0.1N HCl and acetone (1 : 1). Bleomycinic acid was eluted in 100 ml of the final fraction. In accordance with the process of Example 10, the product was treated to yield 420 mg of bleomycinic acid (Cu complex). A 415 mg quantity of unreacted bleomycin was recovered.

EXAMPLE 12

A 100 mg amount of the dihydrochloride of the 3-aminopropyl ester of bleomycinic acid (Cu complex) was dissolved in 2 ml of distilled water, and the solution was adjusted to a pH of 3.0 by the addition of 0.1N HCl. The mixture was heated at 105° C. for 6 hours in a sealed tube. In accordance with the process of Example 10, the product was isolated to yield 83 mg of bleomycinic acid (Cu complex).

EXAMPLE 13

A 100 mg amount of the dihydrochloride of the 3-aminopropyl ester of bleomycinic acid (Cu complex) was dissolved in 2 ml of distilled water, and adjusted to a pH of 5.5 by adding 0.1N HCl. The mixture was heated at 120° C. for 24 hours in a sealed tube. In accordance with the process of Example 10, the product was isolated to yield 68 mg of bleomycinic acid (Cu complex).

EXAMPLE 14

A 100 mg amount of the diacetic acid salt of the 3-aminopropyl ester of bleomycinic acid (Cu complex) was dissolved in 2 ml of distilled water, and the solution was adjusted to a pH of 2.0 and was heated at 80° C. for 6 hours. In accordance with the process of Example 10, the product was isolated to yield 72 mg of bleomycinic acid (Cu complex).

EXAMPLE 15

A 100 mg quantity of the dihydrochloride of the 3-aminopropyl ester of bleomycinic acid (Cu removed) was dissolved in 2 ml of distilled water, and the solution was adjusted to a pH of 4.5 by the addition of 0.1N HCl. The mixture was heated at 105° C. for 6 hours in a sealed tube. In accordance with the process of Example 10, the product was isolated to yield 43 mg of a colorless amorphous powder of bleomycinic acid (Cu removed). The product was treated with copper carbonate to form a 1 : 1 bleomycin-copper complex in accordance with the process of Example 9, to yield 45 mg of bleomycinic acid (Cu complex).

EXAMPLE 16

A 100 mg quantity of the dihydrochloride of the 3-aminopropyl ester of bleomycinic acid (Cu removed) was dissolved in 2 ml of distilled water, and the solution was adjusted to a pH of 5.0 by the addition of 0.1N HCl. The mixture was heated at 120° C. for 24 hours in a sealed tube. In accordance with the process of Example 10, the product was isolated to yield 45 mg of bleomycinic acid (Cu removed). The product was treated with copper carbonate to form a 1 : 1 belomycincopper complex in accordance with the process of Example 9 to yield 42 mg of bleomycinic acid (Cu complex).

Having now fully described this invention, it will be apparant to one of ordinary skill in the art that many changes and modifications can be made thereto without departing from the spirit or scope of the invention as set forth herein.

What is claimed is:

1. A process for preparing a 3-aminopropyl ester of bleomycinic acid or an acid salt thereof which comprises reacting a 3-methyl-mercaptopropylaminobleomycin or an acid salt thereof at the mercapto sulfur atom with a halide compound having the formula:

R — X wherein R represents —CN, —CH$_2$COOH, —CH$_2$COOR$_1$, —CH$_2$CONH$_2$

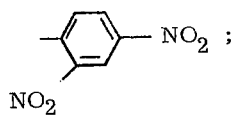

R$_1$ represents a lower alkyl group; and X represents a halogen atom in an acidic aqueous medium.

2. The process of claim 1, wherein said 3-methylmercaptopropylaminobleomycin or an acid salt thereof is a copper complex, and said 3-aminopropyl ester of bleomycinic acid or an acid salt thereof is a copper complex.

3. The process of claim 1, wherein the 3-aminopropyl ester of bleomycinic acid or an acid salt thereof is isolated from the reaction products by treating said ester with an ion-exchange resin.

4. The process of claim 1, wherein said acidic medium contains hydrochloric acid or sulfuric acid.

5. The process of claim 1, wherein said acidic medium contains an organic acid selected from the group consisting of formic acid, acetic acid and trifluoroacetic acid.

6. The process of claim 1 wherein said acidic aqueous medium contains an organic solvent selected from the group consisting of methanol, ethanol, acetone, dioxane, dimethylsulfoxide, dimethylformamide and ethylene glycol monomethyl ether.

7. The process of claim 1, wherein 3-methylmercaptopropylaminobleomycin is reacted with said halide compound at 0° – 90° C. for 14–48 hours.

8. The 3-aminopropyl ester of bleomycinic acid having the following formula, an acid salt thereof or a copper complex thereof:

9. A process for preparing bleomycinic acid which comprises reacting 3-methylmercaptopropylaminobleomycin or an acid salt thereof at the mercapto sulfur atom with a halide compound having the formula

R — X wherein R represents —CN, —CH$_2$COOH, —CH$_2$COOR$_1$, —CH$_2$CONH$_2$ and

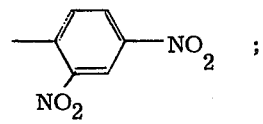

R$_1$ represents a lower alkyl group, and X represents a halogen atom in an acidic aqueous medium, and then hydrolyzing the resulting 3-aminopropyl ester of bleomycinic acid in an acidic medium.

10. The process of claim 9, wherein said acidic aqueous medium contains an organic solvent selected from the group consisting of methanol, ethanol, acetone, dioxane, dimethylsulfoxide, dimethylformamide and ethylene glycol monomethyl ether.

11. A process for preparing bleomycinic acid which comprises hydrolyzing 3-aminopropyl ester of bleomycinic acid in an acidic medium.

12. The process of claim 9, wherein said 3-aminopropyl ester of bleomycinic acid or an acid salt thereof is hydrolyzed at 40°–120° C for 1–24 hours in an acidic medium having a pH of 2.–5.5.

13. The process of claim 9, wherein said 3-aminopropyl ester of bleomycinic acid or an acid salt thereof is a copper complex.

* * * * *

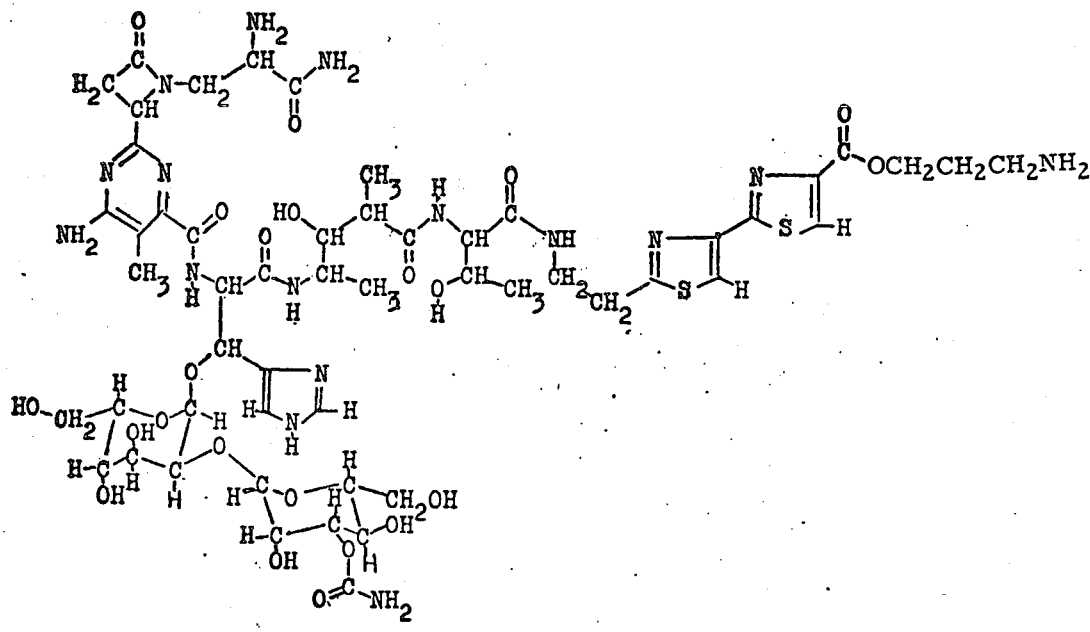

UNITED STATES PATENT OFFICE
CERTIFICATE OF CORRECTION

PATENT NO. : 3,886,133
DATED : May 27, 1975
INVENTOR(S) : HAMAO UMEZAWA ET AL

It is certified that error appears in the above-identified patent and that said Letters Patent are hereby corrected as shown below:

Change Assignee from "Zaidon Hojin Biseibutsu Kagaku Kenkyu Kai"

to --Zaidan Hojin Biseibutsu Kagaku Kenkyu Kai--.

Signed and Sealed this seventeenth Day of February 1976

[SEAL]

Attest:

RUTH C. MASON
*Attesting Officer*

C. MARSHALL DANN
*Commissioner of Patents and Trademarks*